Patented Jan. 31, 1950

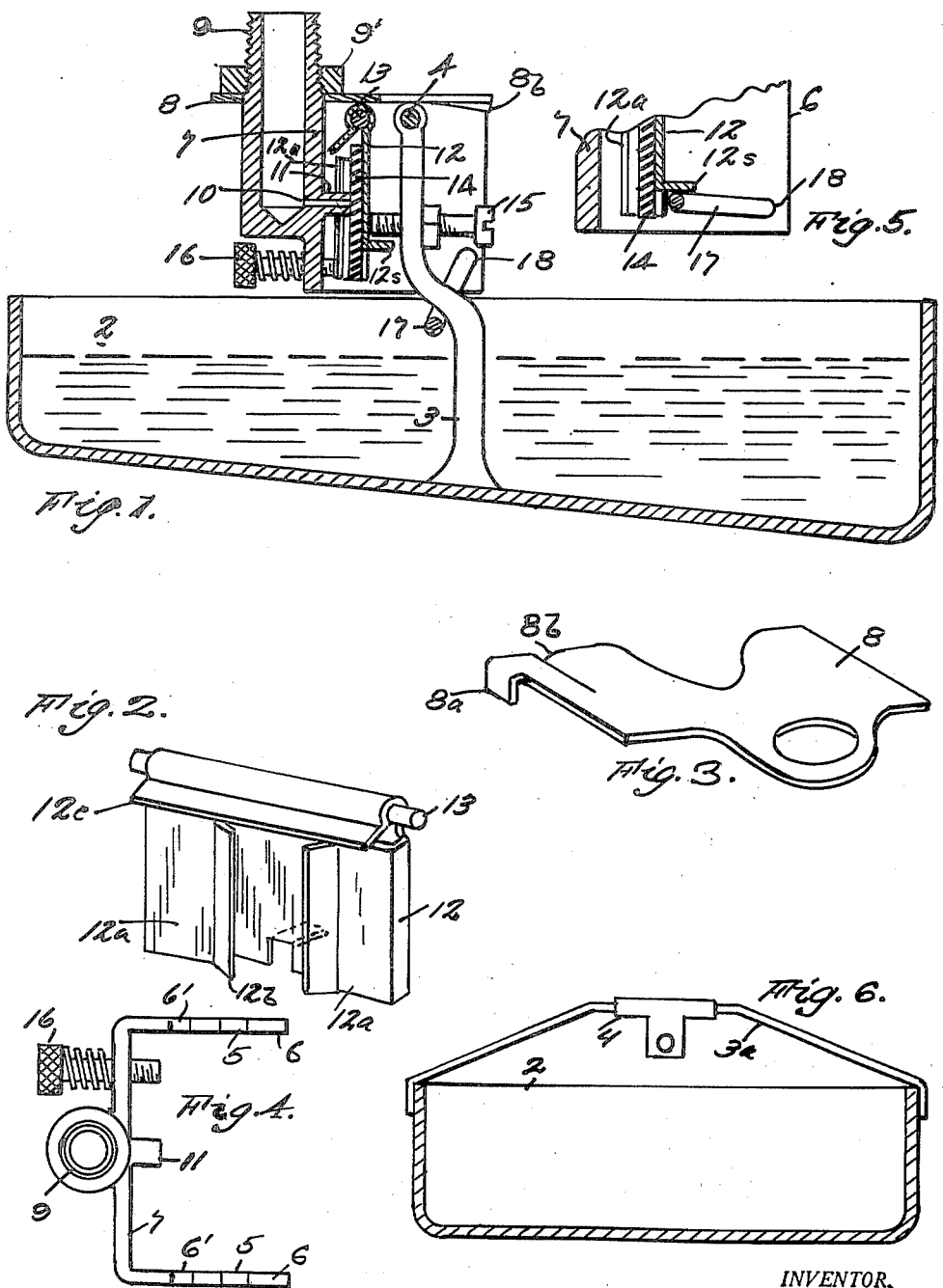

2,496,046

UNITED STATES PATENT OFFICE 2,496,046

POULTRY WATERING FOUNTAIN

Benjamin G. Gilbough, Ramona, Calif.

Application May 28, 1946, Serial No. 672,873

4 Claims. (Cl. 137—68)

This invention is a self-filling, tiltably suspended poultry watering fountain.

It is an object of this invention to provide a simple, compact, efficient and highly sanitary bowl type fountain for watering fowl of many kinds; a purpose being to provide for the ready and quick cleansing of the bowl while suspended.

Further, an object of the invention is to provide for the ready dismounting of the bowl and a related valve shutter from a supporting bracket in case of need; as when the water supply orifice may require cleaning.

An object is to provide a fountain of this use which is free from small and delicate parts and wherein all adjustments may be readily made by ordinary farm or other attendant laborers whose hands, due to the nature of their work, are more or less stiff and awkward or clumsy.

An additional object of the invention is to provide a fountain in which there is a water shut off member into which may be quickly fitted a piece of valve sealing material from stock supply and if not available may be substituted as by a fragment of rubber or the equivalent for a sealing medium.

Another object of the invention is to provide a bowl which may be easily removed or suitably tilted as to a suspending support for cleaning of the fountain, and in this connection an object is to provide for locking the water shutter of the valve when the bowl, which in this invention controls water flow, is wholly removed.

Also, an object is to provide means regulating the height of water in the bowl by adjustment of the closing position of the water shutter, and to provide means for levelling the gravity actuated bowl.

The invention consists in certain advancements in this art as set forth in the ensuing disclosure and having, with the above, additional objects and advantages as hereinafter developed, and whose construction, combinations and subcombinations and details of means and manner of operation will be made manifest in the following description of the herewith illustrative embodiments; it being understood that modifications, variations and adaptations may be resorted to within the scope, spirit and principles of the invention as it is claimed more directly in conclusion hereof.

Figure 1 is a vertical, axial section of the bowl fountain in normal position.

Figure 2 is a perspective of the dismounted water shutter.

Figure 3 is a perspective of a cap plate for the bracket.

Figure 4 is a plan of the bracket.

Figure 5 is a detail showing the shutter lock in effective position.

Figure 6 shows a modified form of bowl in section and its suspending bail.

A bowl 2 of any suitable size, shape and material is provided with an upwardly extending device as a post 3 in Fig. 1, or a bail 3a, Fig. 6, including a transverse, horizontal pivot bar 4 which is off-center as to the center of gravity of the water loaded bowl. This bar 4 is adapted to be readily placed in open top or notch seats 5, Fig. 4, in the top edge of forwardly extending parallel ears 6—6 of a substantial, U-plan bracket 7.

In order to prevent the bowl from being knocked off the ears by movement of fowl or other animals past or under the suspended bowl the bracket has a cover or stop plate 8 which turns horizontally to substantially cover the bracket ears 5 and holds down the supporting pivot 4 and a pivot 13, if and when the bowl or the pivot 13 is accidentally pressed up in the bracket horizontally. When the plate is turned out of the way over the said pivots these can be easily removed upward with their attached parts of the fountain.

Rigidly combined or made integral (as shown in Fig. 1) with the back face of the front or cross-wall of the bracket 7 (Fig. 4) is a central, vertical, pipe threaded, connector part 9 pivotally fitting and around which said plate 8 can be rotated to uncover the seats 5 and seats 6', or reversely rotated to a seat covering position, Fig. 1. A nut 9' on the connector part 9 can be screwed to clinch the plate 8 in the closing position. From the intake bore of the connector 9 leads a small outlet duct 10 in central, integral nipple 11 on the right hand or front face of the wall of the bracket 7, Figs. 1 and 4. This nipple is at a suitable distance below the elongate pivot 4 of the bowl and well rearward of the vertical plane of said pivot.

Means are provided at the outer end of the nipple 11 to be effectively forced by the loaded bowl to close and seal the mouth of the nipple in the normal operation and stop water inflow. This means includes a pendulous, thin-box-like member 12 hanging by said pivot 13 whose extended ends are readily placed in open top recesses 6' in the top edges of the ears 6; the axis of the pivot 13 being along the upper part of the member 12. In this box member is a removable and renewable packer strip 14 of rubber or its substitute which is exposed toward the nipple 11 and between resilient leaves 12a, of the member 12, which hold the sealing packer in place. These leaves have outturned, vertical margins 12b to stop sidewise sprays from the nipple if they develop. And a top leaf 12c of said member stops vertical or upward flowing sprays.

A set screw 15 is provided in the suspending device 3 to engage the near face of the shutter member 12 and force the packing against and shut off flow of water from the nipple 11 when the bowl is loaded to the desired degree. By means of the screw 15 the installed bowl can be controlled in its swing toward the bracket.

The degree of load of water in the bowl is regulated by means of a set screw 16 adjustable in the rear wall of the bracket 7 toward or from the pendent shutter member 12 and engageable with one of the spring leaves 12a.

The bowl 2 can be readily swung up to the right on its pivot 4 to dump out its load of water and it can be scrubbed and brushed while in normal position on the bracket and then tipped up to discharge the cleansing material or soiled water.

Since the nipple 11 is automatically closed by the shutter member 12 acting under the load of the bowl suitable means are incorporated whereby to lock the shutter in closed position when the bowl is swung out of effect or is to be removed. This means includes a free swinging loop 17 having ends 18 pivoted in the side ears of the bracket and adapted to be manually swung up to solidly jam on the lower portion of the shutter 12; this having a spur 12s to stop the locking loop.

The cap plate 8 includes stop lug 8a to stop against the adjacent bracket ear and it also has a depressed latch forming projection 8b to snap over the top edge of said ear so that the plate is removably held in closed position.

What is claimed is:

1. A watering fountain including a bearing bracket and a pendulous, water bowl bodily, wholly supported by and having bearing pivots on the bracket and adapted to be upwardly tilted in one direction for bowl discharge, and means for preventing a direct-upward movement of the bowl as to the bracket and including a shiftable hold-down cap on the bracket and engageable by the said pivots when pressed upward.

2. A watering fountain including a bowl and a bracket means from which it is wholly and pivotally suspended, a fixed nipple on the bracket for water to the bowl, a bowl actuated pendulous shutter supported wholly and pivotally on the bracket adjacent to the nipple, and a locking means on the bracket to secure the shutter in closed position whilst the bowl is tilted away from the shutter.

3. A watering fountain including a fixed nipple, a shutter for the nipple including a spring leaf part, a set screw engageable with the leaf, and a bowl arranged to move the shutter to closing position on the nipple, and means on which the nipple is fixed and the shutter and the bowl are independently suspended and said screw is adjustable.

4. A watering fountain including a fixed nipple, a shutter for the nipple having marginal flanges to stop incidental water spray, a set screw adjustable relative to the bowl and controlling the closing of the shutter by the bowl, and means on which the nipple is fixed, the shutter and the bowl are suspended and the screw is adjustable.

BENJAMIN G. GILBOUGH.

REFERENCES CITED

The following references are of record in the file of this patent:

UNITED STATES PATENTS

| Number | Name | Date |
|---|---|---|
| 350,219 | Trott | Oct. 5, 1886 |
| 463,286 | Cone | Nov. 17, 1891 |
| 567,672 | Wilson | Sept. 15, 1896 |
| 1,653,525 | White | Dec. 20, 1927 |

FOREIGN PATENTS

| Number | Country | Date |
|---|---|---|
| 365,599 | Great Britain | Jan. 20, 1932 |